Jan. 30, 1940.  H. J. MOON  2,188,757
COMBINED BROILER AND GRIDDLE
Filed Aug. 15, 1938  3 Sheets-Sheet 2

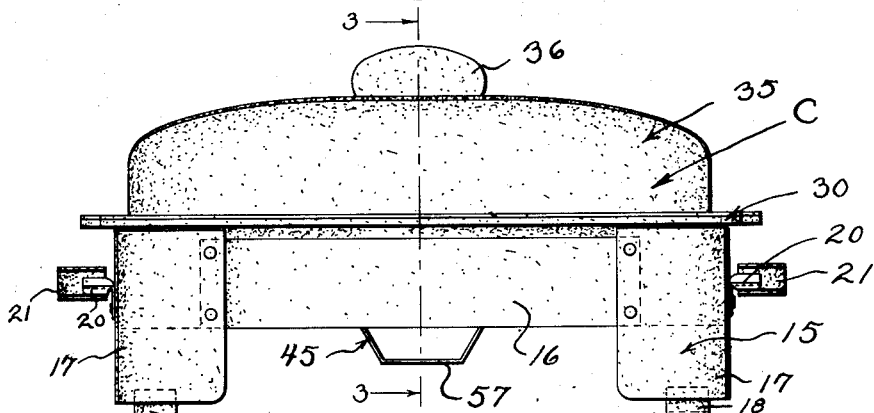
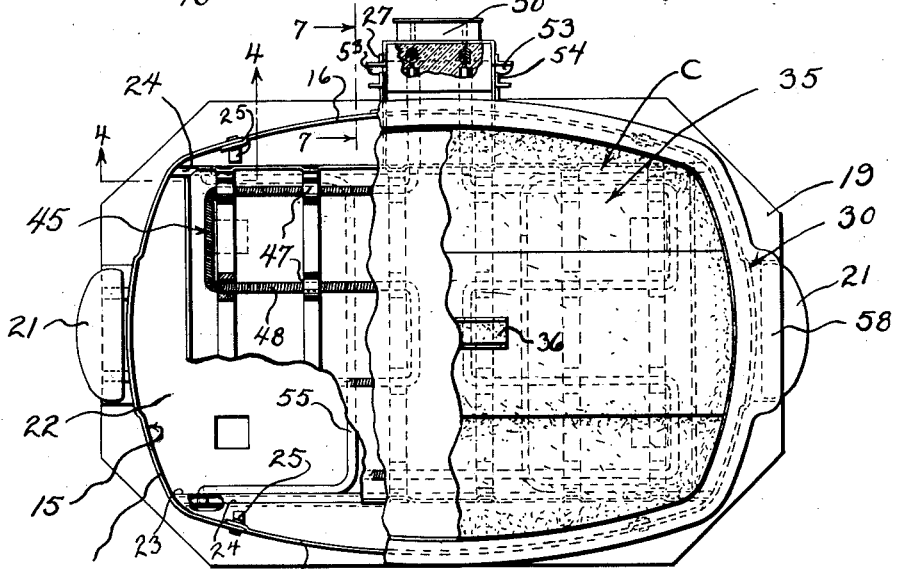
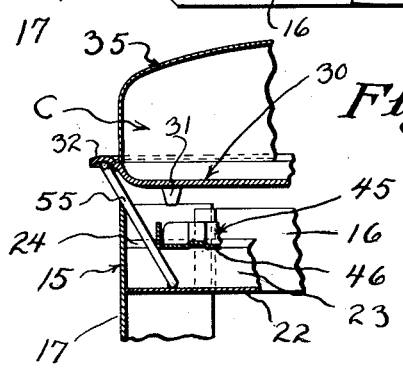

Inventor
H. J. Moon
By
Attorneys

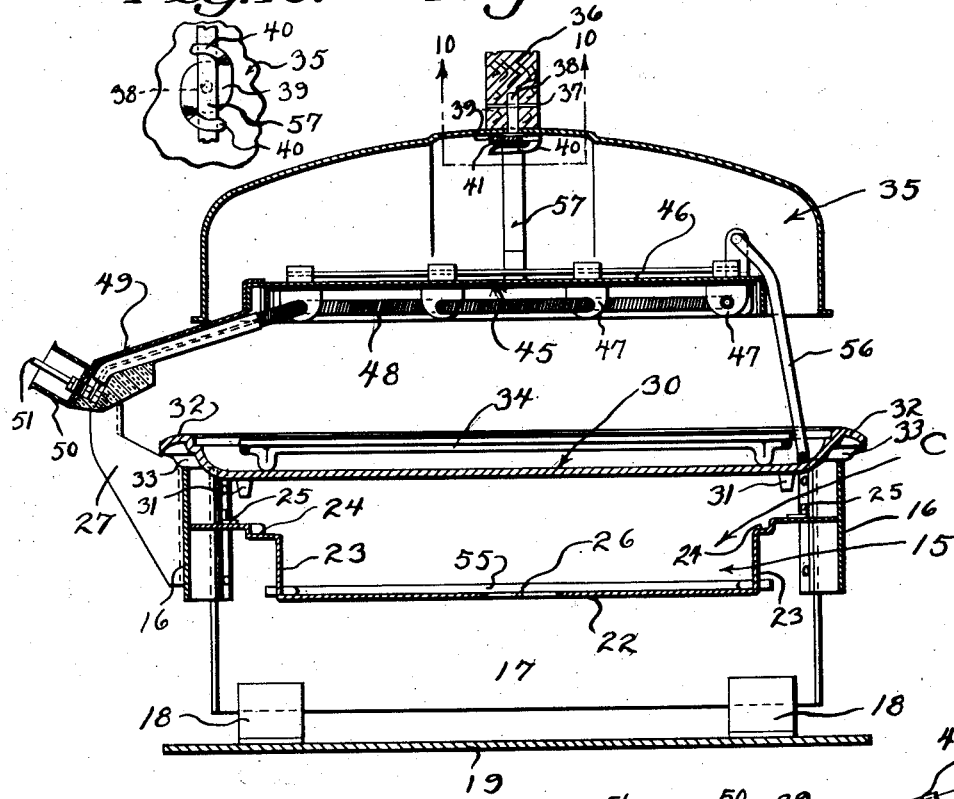

Patented Jan. 30, 1940

2,188,757

UNITED STATES PATENT OFFICE 2,188,757

COMBINED BROILER AND GRIDDLE

Herbert J. Moon, Milwaukee, Wis., assignor to National Enameling and Stamping Company, Milwaukee, Wis.

Application August 15, 1938, Serial No. 224,979

17 Claims. (Cl. 53—5)

This invention appertains to electrical cooking devices, and more particularly to a novel combined electric broiler and griddle.

One of the primary objects of my invention is to provide a device for receiving a serving (sizzling) platter, with electrical means positioned either above or below the platter, whereby meats and other foodstuffs can be broiled or otherwise cooked directly on the platter.

Another salient object of my invention is to provide a cover for the platter, with means for holding the cover above and in spaced relation to the platter and electrical element, when the device is being used as a broiler, whereby to permit a circulation of air to be had around the food being broiled.

A further object of my invention is to provide means for detachably connecting the cover to the reflector or body of the electric cooking element when the device is being used as a broiler, whereby the cover and the electric cooking element can be conveniently manipulated as a unit.

A further important object of my invention is to provide novel means for detachably and hingedly connecting the electric resistance element to the body of the device, whereby the element can be quickly and easily disposed in the device for either broiling or frying, and can be conveniently swung back to an inoperative position during broiling.

A still further object of my invention is to provide a combined broiler and griddle having slow or fast frying positions, obtained merely by disposing the platter and electric cooking device in predetermined positions relative to one another.

A still further object of my invention is to provide a combined electric broiler and griddle of the above character, which will be durable and efficient in use, one that will be simple and easy to manufacture, and one which can be placed upon the market at a reasonable cost.

With these and other objects in view the invention consists in the novel construction, arrangement, and formation of parts, as will be hereinafter more specifically described, claimed, and illustrated in the accompanying drawings, in which drawings:

Figure 1 is a side elevation of my improved device, showing the cover disposed directly on the serving platter, and the serving platter resting on the body or base of the device.

Figure 2 is a top plan view of the combined broiler and griddle, with parts thereof being broken away and in section, the parts in this view being shown in the same position as that illustrated in Figure 1.

Figure 4 is a detail, fragmentary, longitudinal section, taken on the line 4—4 of Figure 2, looking in the direction of the arrows, the figure being taken on the same scale as Figures 1 and 2, and showing the serving platter held in an elevated position above the base for slow cooking.

Figure 6 is an enlarged, transverse, sectional view through the device, taken substantially on the line 6—6 of Figure 5, looking in the direction of the arrows.

Figure 7 is an enlarged, fragmentary, detailed, sectional view, taken on the line 7—7 of Figure 2, looking in the direction of the arrows, showing means for supporting the electric resistance element in its lowered position so that the device can be used as a griddle.

Figure 8 is a view similar to Figure 7, but showing the resistance element reversed and in a raised position to permit the device to be used as a broiler.

Figure 9 is a detailed, sectional view taken substantially on the line 9—9 of Figure 8, looking in the direction of the arrows, illustrating the construction and arrangement of the hinge.

Figure 10 is a detailed, sectional view taken substantially on the line 10—10 of Figure 6, looking in the direction of the arrows, illustrating the latch utilized for detachably connecting the cover with the reflector of the electric resistance element.

Figure 3:
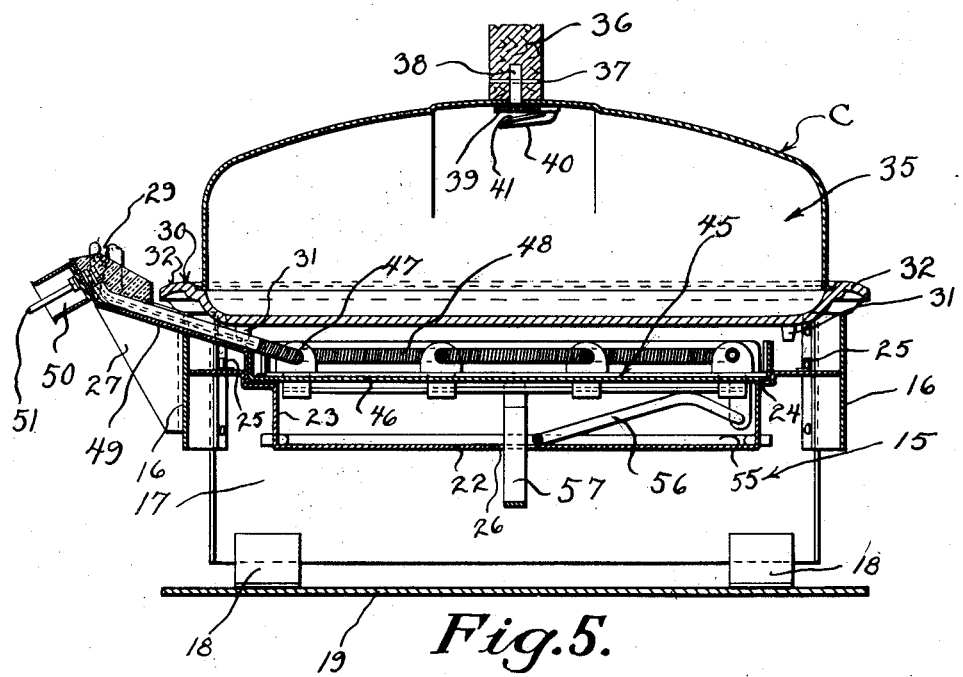
Figure 3 is an enlarged, transverse, sectional view through the device, taken on the line 3—3 of Figure 1, looking in the direction of the arrows.

Referring to the drawings in detail, wherein similar reference characters designate corresponding parts throughout the several views, the letter C generally indicates my novel cooking device, and, as shown, the same includes a supporting base or body 15 for receiving the sizzling or serving platter 30. The body 15 and the platter 30 are provided with a cover 35. Likewise, the body or base 15 carries or supports the electric cooking element 45, which can be disposed above or below the sizzling or serving platter 30, as will also be later set forth.

The base or supporting body 15 includes longitudinally extending arcuate side pieces 16, and these pieces are rigidly secured to arcuate end pieces or walls 17. The end pieces or walls 17 extend a material distance below the side pieces 16, so that a circulation of air will be had below the base. The end pieces 17 can carry supporting feet 18 for resting upon a table or other support. It is preferred to provide an asbestos or like mat 19 for the device to rest upon, but obviously this is optional with the user, and forms no part of the present invention.

Handles 20 are carried by the opposite ends of the base to facilitate the carrying thereof, and these handles can detachably receive hand-grips 21, which are made from non-heat-conducting material. Thus, when the base is in a hot condition, the hand-grips 21 can be slid on the handles 20, and, as illustrated, the grips 21 are grooved on their inner faces to receive handles.

The side and end walls or pieces enclose a bottom guard wall or plate 22. This plate is provided with a marginal flange 23, which is offset adjacent to its upper end to provide a shoulder 24, the purpose of which will be later set forth. This bottom wall can be secured in any desired manner to the side or end pieces, and, as shown, reinforcing brackets 25 are provided for facilitating the attaching of the bottom wall or guard plate to the side and end walls. The wall 22 protects the support on which the device C is placed from the heat of the electric cooking element 45, and this wall is provided with a central opening 26 for receiving a part of the electric cooking element. One side wall or piece 16 has firmly secured thereto upstanding, laterally disposed arms 27, and these arms 27 have formed in their upper ends openings 28 having restricted entrance throats 29, for a purpose which will be later set forth. The base or supporting body 15 can be formed from any desired material suitably treated and formed so as to present a pleasing and attractive appearance to the eye, as can be well understood by designers in this field.

The sizzling or serving platter 30 is preferably formed of relatively heavy metal, and the platter can also be formed in a pleasing configuration and treated to present a pleasing and attractive appearance.

Figure 5:
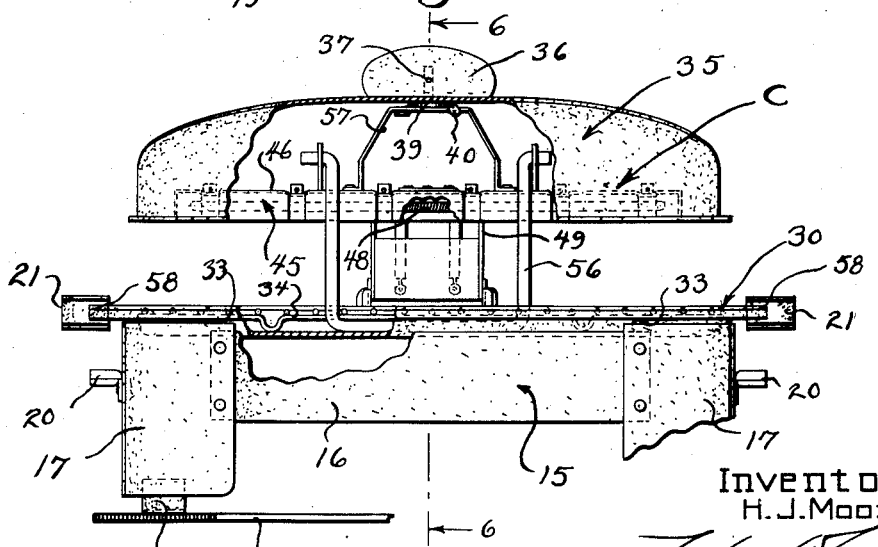
Figure 5 is a side elevation of the improved device, taken on the same scale as Figures 1 and 2, with parts thereof broken away and in section, the view showing the device being used as a broiler.

The extreme lower wall of the platter is provided with depending feet 31, whereby the same can be conveniently placed on a table or other support, where the foodstuffs are to be served. The platter is formed with an outstanding marginal flange 32, and the flange carries depending lugs 33, which are adapted to rest on the upper edge of the base, as is clearly shown in Figures 1, 3, and 6 of the drawings. When steaks and the like are being broiled directly on the platter 30, a wire supporting rack 34 can be placed on or inserted in the platter, as is shown in Figures 5 and 6 of the drawings.

The cover 35 is of a sufficient size as to completely cover the serving platter 30, with the exception of the marginal flange 32, and this flange 32 is preferably shouldered so as to form a seat for the cover. The cover 35 is preferably formed from highly polished metal, and can be chromium-plated, if so desired, and the outer face treated in any desired manner preferred by the manufacturer.

The cover at its center is provided with a manipulating handle 36, and this handle is formed from heat-insulating material, and is secured by means of a crosspin 37 with a spindle or latch shaft 38, which rotatably extends through the cover. The inner end of the shaft or spindle 38 has formed thereon, or rigidly secured thereto, a latch plate 39. The latch plate 39 and hand-grip 36 will hold these parts in assembled position on the cover, and from the description so far it can be seen that the handle and latch plate 39 can be readily rotated.

The latch plate 39, at its opposite ends, has formed thereon depending oppositely extending latch fingers 40. The upper faces of the latch fingers are inclined, as at 41, so as to form cam faces. The latch is adapted to cooperate with the electric cooking element 45 in certain positions thereof, as will also be clearly set forth.

The electric cooking element 45 includes a body portion 46, which is of a pan shape, and this body can be formed from sheet metal, if so desired. Extending transversely across the body 46 are a plurality of rows of porcelain or like insulating lugs 47, and these lugs support a coiled electric resistance wire 48. The inner face of the body portion 46 forms a reflector for the heat rays. The insulating lugs 47 can be secured to the pan or body 46 in any preferred manner. The coil resistance wire 48 is strung back and forth on the pan or body so that maximum benefit will be derived therefrom. One side of the pan or body 46 has formed thereon a laterally and upwardly inclined hinge portion 49, and this hinge portion carries a socket or receptacle 50 for the plug of a current-conducting wire (not shown). Obviously, the mentioned wires can be connected with any household outlet. The ends of the coil resistance wire 48 are electrically connected with the terminal points 51 of the socket or receptacle 50.

The body 46 is of a sufficient size as to be received within the base 15, and the electric cooking element 45 is adapted to rest on the shoulders 24 of the bottom wall 22 when the electric cooking element is placed in the base with the resistance coils uppermost, as is shown in Figures 2, 3, and 4. With the electric cooking element in the position mentioned, the hinged portion 49 extends out of the base 15 at one side thereof. As clearly illustrated in Figure 3, the hinged portion extends between the upper edge of the base 15 and the serving or sizzling platter 30. Thus, the cooking element 45 can be conveniently placed in the base below the serving or sizzling platter. Obviously, pan-cakes and the like can then be readily cooked on the serving platter, or other foodstuffs may be toasted thereon, and the device used as an ordinary electric griddle.

The hinge portion 49 has formed thereon right-angularly extending, spaced, parallel wings 52, and these wings carry laterally extending ears 53. The ears 53 are, in turn, provided with restricted slots 54. When the electric cooking element 45 is placed in the base, the wings 52 of the hinge portion 49 ride between the arms 27 of the base, and the lugs 53 are inserted in the openings 28 of the arms through the narrow neck entrances 29. This also acts as a support for the electric cooking element, and the connection forms a hinge for the electric cooking element. Obviously, when the serving platter 30 is removed, the electric cooking element can be raised or lowered on the arms 27 as a hinge, and the arms 27 lying in the slots 54 prevent displacement of the heating element. As the platter 30 is slightly spaced above the base by the lugs 33, circulation of air under the platter is assured.

In some instances it is desirable to hold the platter a considerable distance above the electric heating element 45, such as during slow cooking or while cooked foodstuffs are being held at a predetermined temperature preparatory for serving. Wire legs 55 are rockably mounted on the bottom wall 22 of the base 15 adjacent to the opposite ends of the base. Normally, the rack 55 lies flat against the upper face of the wall 22, as is clearly shown in Figures 2, 3, and 6. However, the legs 55 can be swung to an elevated position above the base, and in this position the serving platter can be placed on the upper ends of the legs, as is clearly shown in Figure 4. The legs can be swung back against the end walls or pieces 17 on the base so that accidental rocking movement of the legs 55 will be prevented.

When the device is being used as a griddle, the cover 35 may be either left on or off the tray as may be desired.

In broiling meats and the like, the electric heating element 45 is removed from the base 15 and the arms 27, and the position thereof is reversed, as shown in Figures 5, 6, and 7. During the removal of the electric heating element, the sizzling platter 30 is taken off the bottom or base, after which the electric heating element is bodily removed from the base and the ears 53 are moved out of the openings 28 in the arms 27. The platter 30 is now placed back on the base, and the wire rack 34 can be disposed on the platter. The heating element is now arranged above the platter with the coils 48 facing downwardly, and the ears 53 are again moved into the openings 28 until the slots 54 engage the arms 27.

On the opposite side of the electric heating device 45 from the hinge portion 49, a swinging wire bail or leg 56 is provided. This wire bail or leg 56 is normally swung back against the body 46 of the electric heating device; and when the heating device is positioned for broiling, the bail or leg 56 is swung down into engagement with the platter 30, and this holds the heating device in a raised, upright position above the platter 30. Circulation of air is assured around the meat or other foodstuffs being cooked. The reflector or body portion 46 of the heating device has secured thereto a transversely extending bridge-piece or handle 57, and after the heating device is arranged above the tray, the cover 35 is placed over the tray and the heating device against the bridge-strap 57. The bridge-strap 57 spaces the cover from the electric heating device, and the body portion 46 serves to reflect the rays of heat downwardly toward the platter. By turning the cover handle 36 in the proper direction, the latch arms 40 on the plate 39 can be moved under and into gripping contact with the bridge-strap, and, thus, the cover 35 will be securely fastened on the bridge-strap and connected with the electric cooking device. By grasping the handle 36, the cover and the electric cooking device can be swung back on the arms 27, and the cook can readily see how the broiling is progressing, and the meats and the like can be readily placed on or removed from the rack.

When the electric cooking device 45 is disposed in its lowered position for frying or baking, the bridge-strap 57 extends through the opening 26 in the bottom wall 22 of the base 15.

The hand-grips 21 can be utilized for removing the tray 30 from the base after steaks or the like have been broiled on the platter. Thus, the hand-grips 21 can be easily and quickly removed from the handles 20 of the base, and then slipped on the thick handle portions 58 at the opposite ends of the tray.

From the foregoing description, it can be seen that I have provided an exceptionally durable form of combined electric broiler and griddle, which is of such character as to be easily handled and manipulated by a housewife.

Changes in details may be made without departing from the spirit or the scope of my invention, but what I claim as new is:

1. A combined electric broiler and griddle comprising, a base, a serving platter detachably associated with the base, and an electric heating device removably associated with the base and adapted to be selectively positioned either above or below the platter.

2. A combined electric broiler and griddle comprising, a supporting base, a serving platter removably positioned upon the base, and an electric heating element removably and hingedly associated with the base adapted to be positioned above or below the platter, as may be desired.

3. A combined electric broiler and griddle comprising, a supporting base, a serving platter removably mounted upon the supporting base, an electric heating device removably associated with the base and adapted to be disposed above or below the platter, as may be desired, and means for detachably associating a cover with the electric heating device when the same is arranged above the platter.

4. A combined electric broiler and griddle comprising, a supporting base, a serving platter removably mounted upon the base, a removable cover for the serving platter, an electric heating element removably mounted upon the base and adapted to be selectively positioned either below or above the platter, and means detachably connecting the cover with the electric heating element when the same is disposed above the platter.

5. A combined electric broiler and griddle comprising a base, a serving platter removably mounted upon the base, laterally extending supporting arms carried by the base, and an electric heating device removably and hingedly connected with the arms and adapted to be selectively positioned either above or below the platter.

6. An electric cooking device comprising a base, a serving platter having depending feet adapted to engage a supporting surface when the platter is removed from the base, an electric heating element disposed within the base below the platter, and lugs on the platter for engaging the upper edge of the base whereby to space the platter from the base to permit a circulation of air between the platter and the electric heating device.

7. An electric cooking device comprising a base, an electric resistance element in the base, and a removable serving platter associated with the base above the electric resistance element, and depending lugs on the platter for engaging the upper edge of the base whereby to space the major portion of the platter from the base, as and for the purpose specified.

8. An electric cooking device comprising, a base having side, end, and bottom walls, said bottom wall having an offset portion defining a raised shoulder, a serving platter removably positioned upon the upper edge of the base, and a removable electric resistance element disposed in the base and mounted upon said shoulder, whereby said resistance element is spaced from the tray and above the major portion of the bottom wall.

9. An electric cooking device comprising, a base, an electric resistance element mounted in said base, a removable serving platter adapted to normally rest upon the upper edge of the base above the resistance element, and hinged legs for supporting the platter in a raised position above the base and resistance element.

10. An electric cooking device comprising, a base including end, side, and bottom walls, an electric resistance element disposed in said base, a removable serving platter adapted to normally rest upon the upper edge of the base, and legs hingedly carried by the opposite ends of the bottom wall movable above the upper edge of the base for supporting the platter in elevated position above the base.

11. A combined electric broiler and griddle comprising, a base, laterally extending arms on the base, a serving platter removably mounted on the base, an electric heating device removably associated with the base and adapted to be disposed either above or below the platter, said electric heating device having a hinge portion on one side for engaging the arms, and a leg on the opposite side for engaging the platter.

12. A combined broiler and griddle comprising, a base, laterally extending spaced arms on the base having openings in the upper ends thereof and restricted neck entrances leading to said openings, a serving platter removably mounted on the base, means normally spacing the platter from the upper edge of the base, an electric heating device including a reflector body and a coil resistance element carried by one face of the body, an outwardly extending hinge portion on one side of the body, said electric heating device being adapted to be disposed either above or below the platter with the resistance element facing the platter, the hinge portion being adapted to protrude between the platter and the top edge of the base when the heating device is disposed below the platter, and laterally extending ears on the hinge portion movable into and out of the openings in the arms through the restricted neck entrances for hingedly and removably supporting the electric heating device.

13. A combined broiler and griddle comprising, a base, laterally extending spaced arms on the base having openings in the upper ends thereof and restricted neck entrances leading to said openings, a serving platter removably mounted on the base, means normally spacing the platter from the upper edge of the base, an electric heating device including a reflector body and a coil resistance element carried by one face of the reflector body, an outwardly extending hinge portion on one side of the pan, said electric heating device being adapted to be disposed either above or below the platter with the resistance element facing the platter, the hinge portion being adapted to protrude between the platter and the top edge of the base when the heating device is disposed below the platter, laterally extending ears on the hinge portion movable into and out of the openings in the arms through the restricted neck entrances for hingedly and removably supporting the electric heating device, and a hinged leg on the pan opposite the handle movable into engagement with the tray at a point spaced from the arms when the heating device is arranged above the tray.

14. A combined broiler and griddle comprising, a base, a serving tray removably mounted upon the base, a removable electric heating element associated with the base and adapted to be selectively positioned either above or below the platter, said heating device including a reflector body, an electric resistance coil carried by one face of the reflector body, a bridge-strap carried by the opposite face of the reflector body, a cover for the platter, a rotatable handle on the cover, and a latch actuated by said handle for engaging the bridge-strap when the handle is moved in one direction, whereby to connect the cover with the heating device.

15. An electric cooking device comprising, a base, a removable serving platter, and an electric heating element adapted to be selectively positioned above or below the platter, said platter having a smooth upper surface, whereby the same can be used for frying pancakes when the electric heating element is disposed below the same.

16. An electric cooking device comprising, a base, an electric resistance element mounted in said base, a removable serving platter adapted to normally rest upon the upper edge of the base above the resistance element, and means for supporting the platter in a raised position above the base and resistance element, as and for the purpose specified.

17. An electric cooking device comprising, a base, an electric resistance element mounted in said base, a removable serving platter, and means for holding the platter in predetermined positions relative to the electric resistance element.

HERBERT J. MOON.